Nov. 5, 1940. H. S. TURNER 2,220,743
CONTROL MEANS
Filed June 3, 1939 4 Sheets-Sheet 2

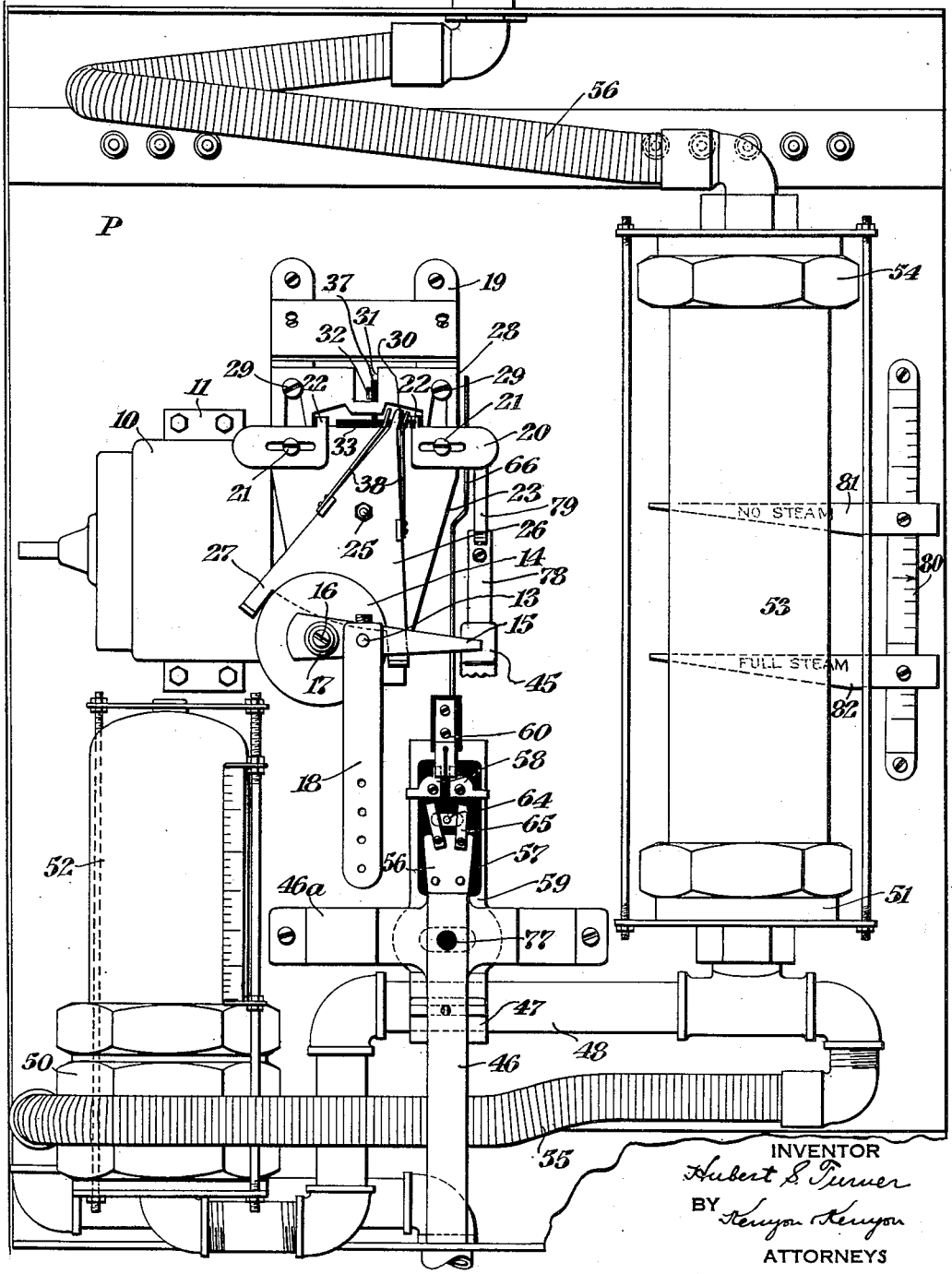

INVENTOR
Hubert S. Turner
BY Kenyon & Kenyon
ATTORNEYS.

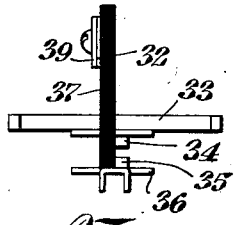
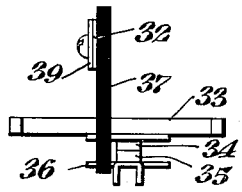
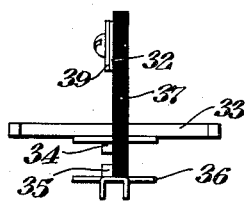
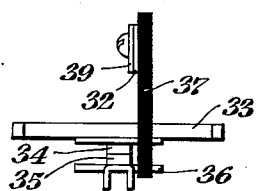
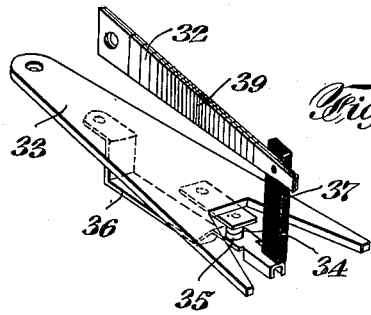
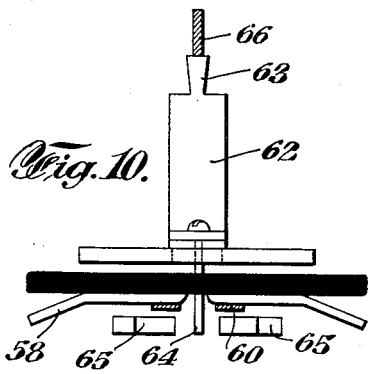
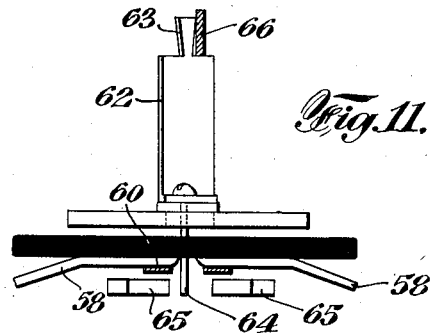
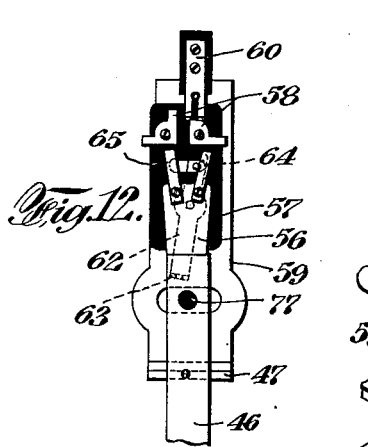
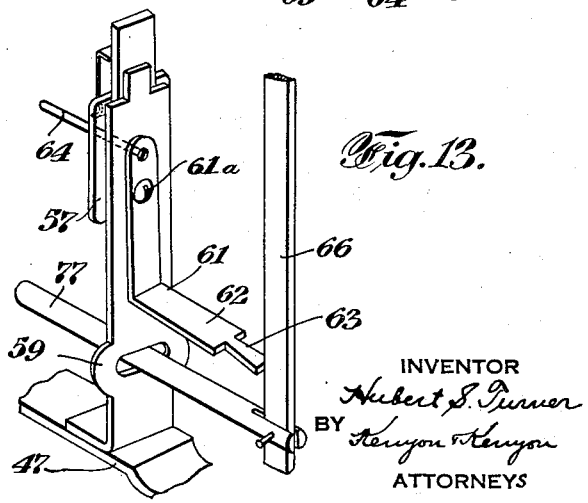

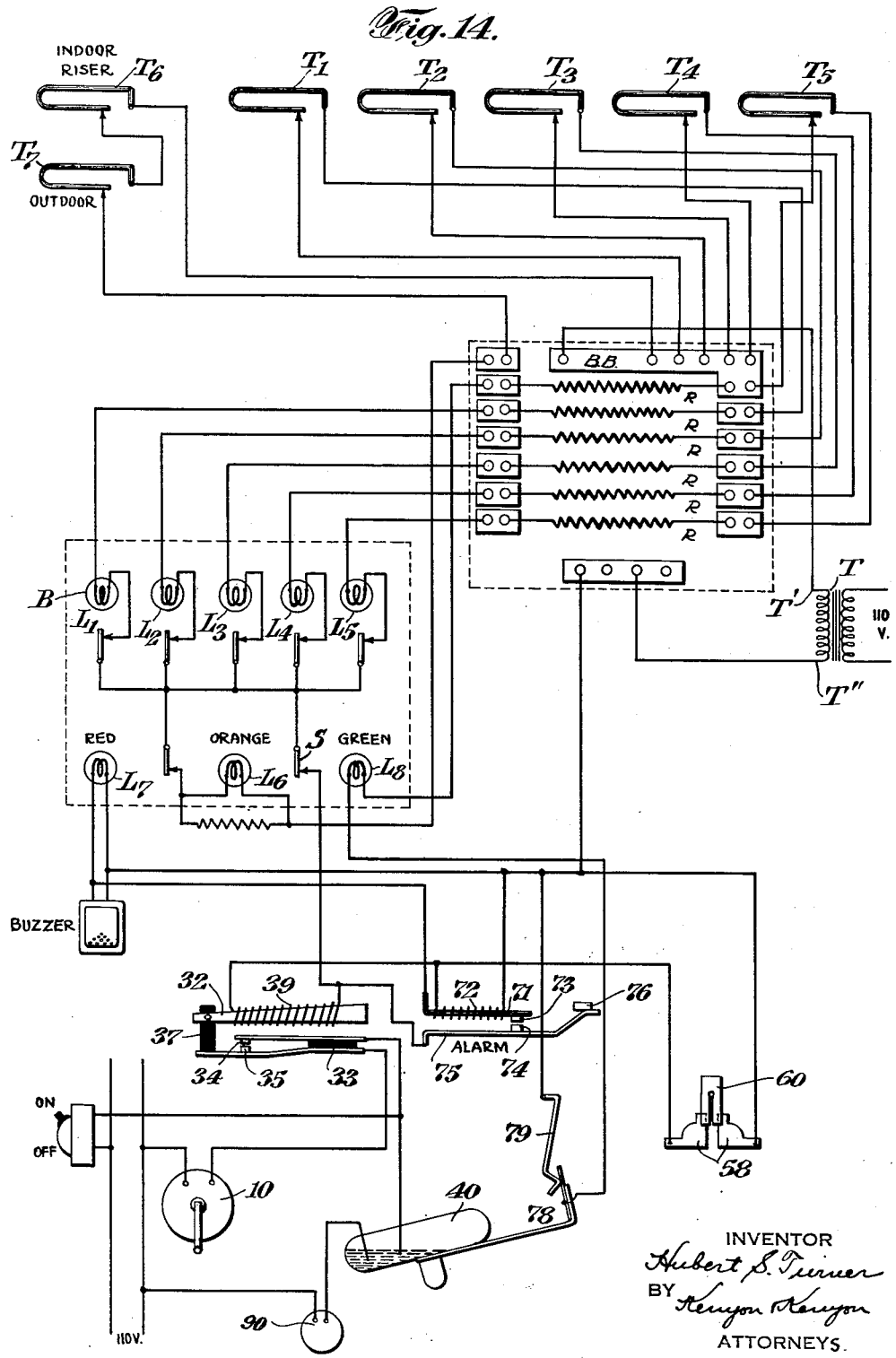

Patented Nov. 5, 1940

2,220,743

UNITED STATES PATENT OFFICE 2,220,743

CONTROL MEANS

Hubert S. Turner, Brooklyn, N. Y.

Application June 3, 1939, Serial No. 277,144

21 Claims. (Cl. 236—9)

This invention relates to control means for steam-heating systems and more especially to control means for a steam-heating system for a multi-tenanted building having a central energizing heat source.

An object of this invention is a control system which is responsive to temperature variation of the order of one-half a degree and is effective to maintain substantially uniform temperature throughout a multi-tenanted building.

A further object is a control system having signal means for indicating at a central station the heat conditions prevailing in the various rooms and also any improper conditions existing in the operation of the heating system.

An additional object is a control system which energizes an indicating signal in the event of improper conditions of water level or steam pressure in the boiler and de-energizing the heat source in the event that such conditions exceed a predetermined limit or become abnormal.

The control apparatus of this invention is intended primarily for use in connection with a steam heat system for a multi-tenanted building, the system including an electrically controlled heat generator such, for example, as a forced draft coal burner or an oil or gas burner and a steam boiler associated with the heat generator. In some or all of the rooms are installed thermostats designed to open and close an electrical circuit which, either by itself or in co-operation with other similar circuits regulates energization of the control apparatus to supply heat as required by the temperature conditions in the various rooms. Also, the control apparatus embodies means for discontinuing operation of the heat generator or diminishing the heat furnished in the event of the development of excess steam pressure in the boiler or in the event that the level of water in the boiler drops below or rises above predetermined levels.

Preferably, the energization of the heat source is regulated by a motor driven rotor and the motor circuit is provided with a pair of self-closing contacts normally held open by means actuated by a heat-responsive member. A heater circuit for said member is connected in multiple with each of the thermostats which are designed for operation upon one-half degree temperature variation. The heater is so designed that closure of one or more thermostats for a predetermined length of time is required for actuation of the contact-engaging means to permit the contacts to close, thereby energizing the motor to actuate the rotor with resultant energization of the heat source. The rotor actuates means to re-engage the contact-engaging means with the contacts after a predetermined extent of operation of the rotor to open said contacts and de-energize the motor with the heat source remaining energized. Upon temperature increase of one-half degree, the closed thermostats open with resulting de-energization of the heater in circuit therewith, whereupon the heat-responsive member returns to original position with further release of said contacts into closed position to effect further rotation of the rotor to de-energize the heat source and cause re-engagement of the contact-engaging means with the contacts to open them. Momentary closure of one or more room thermostats due to vibration thereof or due to another cause will not result in energization of the control apparatus, in view of the fact that it is necessary for the contacts to remain closed for a predetermined length of time before the heat-responsive member can be heated sufficiently to cause release of the contacts into closed condition.

At a central station, a signal light in series with each thermostat is provided and when energized indicates that the temperature in the location of such thermostat has dropped below the thermostat setting. Also, associated with the heat source is a signal light which, when energized, indicates that heat is being supplied to the boiler.

In addition, signal means are provided for indicating improper conditions of water level or steam pressure in the boiler. Such signal means comprise a light and a buzzer which are intermittently operated when steam pressure or water level in the boiler varies slightly from predetermined limits. Upon restoration of proper conditions either by the attendant or by operation of the system itself, such signal means becomes inoperative. However, in the event that such improper conditions exceed a predetermined limit, the signal becomes steady and simultaneously the heat source is de-energized. In the latter case manual resetting of the device is necessary, which can only be done after the steam pressure or water level has been brought back to normal.

Other objects, novel features and advantages of this invention will become apparent from the following specification and accompanying drawings, wherein:

Fig. 1 is a front elevation of a control apparatus embodying the invention;

Figs. 5, 6, 7 and 8 are sectional views substantially on the line 5—5 of Fig. 2 illustrating the operation of certain parts of the device;

Fig. 9 is a perspective view of the contact-controlling apparatus;

Figs. 10 and 11 are sectional views substantially on the line 10—10 of Fig. 2 showing different operating positions of certain parts;

Fig. 12 is a front elevation of Fig. 10;

Fig. 13 is a perspective view of the mechanism illustrated in Fig. 12, and

Fig. 14 is a wiring diagram.

Figure 2:
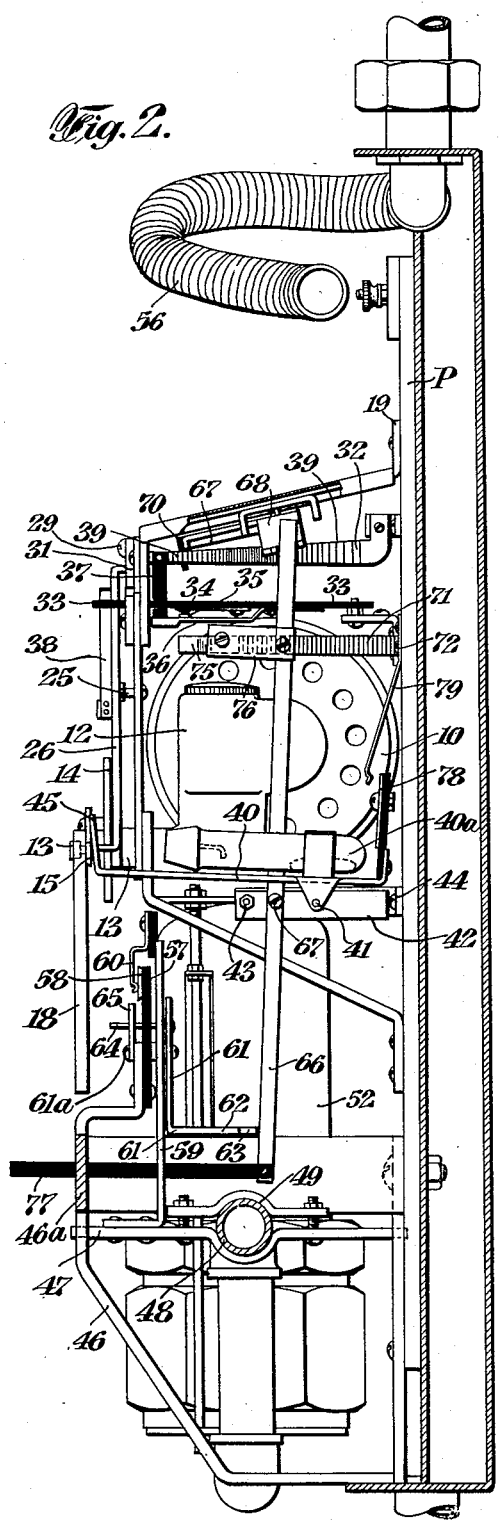
Fig. 2 is a side elevation.

As shown in Figs. 1 and 2, a motor 10 is supported by a suitable bracket 11 from a panel P of electric insulating material and is provided with reduction gearing contained in the housing 12 and having a driven shaft 13. A disk 14 is eccentrically supported by the shaft 13 and an arm 15 is attached to the shaft 13. A screw 16 is received in a slot 17 of the arm 15 and provides means for effecting limited arcuate adjustment of said arm. A second arm 18 is fixed to the shaft 13 and is provided with a series of holes by means of which a cable or the like may be attached to the arm at different radial distances from its axis of rotation.

A generally H-shaped bracket 19 has the upper ends of its two side members attached to the panel P and the intermediate portion of the bracket extends outwardly and downwardly from the panel with the lower ends of the side members vertically arranged. A pair of slides 20 are adjustably supported by the bracket 19 through the intermediary of screws 21 passing through slots in the slides 20 and threaded into the side members of the bracket 19, each slide being provided with an upwardly projecting lug 22. A plate 23 is supported from the bracket 19 by the screws 21 and is provided with a pin 25 on which is oscillatably mounted a rocker 26 having arms 27 upturned at their ends to engage the periphery of the disk 14.

A rider 28 of electrical insulating material is provided with a pair of slots in which are received screws 29 threaded into the side members of the bracket 19 and said slots are slightly inclined toward each other downwardly. The bottom edge of the rider 28 is engaged by a prong 30 forming a part of the rocker 26 and said bottom edge is so shaped as to provide a pair of oblique surfaces sloping upwardly toward the center of the rider and terminating in a second pair of short oblique surfaces sloping downwardly and connected by a horizontal portion. A recess 31 is formed in the upper portion of the rider 28, and a resilient bi-metal thermostat strip 32 is supported at one end from the panel P with its other end extending into the recess 31. (Figs. 1 and 2).

Just below the bi-metal strip 32 is an arm 33 composed of electrical insulating material pivotally supported at one end by the panel P and having its other end resting on the top edge of the plate 23 between the lugs 22 which act as stops to limit swinging movement of the arm 33. The outer end of the arm 33 is forked so as to have a portion arranged at either side of the prong 30. A contact 34 is fixed to the member 33 and a contact 35 is carried by one end of a leaf spring 36 having its other end fixed to the arm 33 and having its contact end underlying the recess in the free end of the arm 33 (Fig. 9). A prong 37 of insulating material is carried by the free end of the thermostat strip 32 and is adapted under certain conditions to engage the free end of the leaf spring 36 to disengage the contact 35 from the contact 34. Two spring arms 38 are carried by the rocker 26 and have their ends extending into the recess in the end of the arm 33 at either side of the prong 30 (Fig. 1).

Around the strip 32 is wound a resistance wire 39 forming a heating coil which is in circuit with a source of electrical energy (Fig. 14) and each of a plurality of room thermostats of which five are shown here and designated $T_1$, $T_2$, $T_3$, $T_4$ and $T_5$. The contacts 34 and 35 are connected by suitable wiring in circuit with a source of electrical energy and the motor 10 so that whenever the contacts are closed, the motor is energized (Fig. 14).

The arrangement just described provides for intermittent rotation of the disk 14 and arms 15 and 18 through arcs of approximately 180°. With the parts in the position shown in Figs. 1 and 5, the contacts 34 and 35 are open and the motor is de-energized, and all the room thermostats are open. Now assume that a room thermostat closes, thereby causing the flow of current in the heating coil 39 with consequent heating of the strip 32. The strip is warped to move its end to the left (Fig. 6) sufficiently to disengage the prong 37 from the left edge of the spring 36, thereby resulting in closing of the contacts 35 and 36 with consequent energization of the motor 10. Operation of the motor causes counterclockwise rotation of the shaft 13 which in turn causes the rocker 26 to swing counterclockwise, to a degree depending upon the eccentricity and diameter of the disk 14 (Fig. 1). The prong 30 slides along the bottom edge of the rider 28 elevating it, together with the free end of the strip 32 sufficiently for the prong 37 to clear the spring 36 and then dropping the rider and strip. At the same time, the left hand spring 38 engages the left prong of the arm 33 to move it to the left, such movement being permitted due to the fact that the prong 37 has been elevated. The extent of movement of the free end of the arm 33 is sufficient to locate the free end of the spring 36 under the prong 37 so that when it is dropped, it opens the contacts 34 and 35 (Fig. 7). The timing is such that the contacts 34 and 35 are opened after the disk 14 has completed one-half revolution.

The contacts 34 and 35 are held out of contact so long as the strip 32 is maintained in warped position by heat generated in the heating coil 39. Discontinuance of the flow of current through the coil 39 as by opening of a thermostat results in the strip 32 returning to original temperature and position which will cause the prong 37 to slip off the right edge of the spring 36, thereby again energizing the motor 10 (Fig. 8). Thereupon, the above-described sequence of operations is repeated except that the rocker 26 moves clockwise and the free end of the arm 33 is moved from left to right. The timing is so arranged that the contacts 34 and 35 are again opened when the disk 14 returns to original position.

A carrier 40 for a mercury switch 40a is pivotally supported by a pin 41 carried by a lever 42 pivotally supported by a pin 43 carried by a bracket 44, the inner end of which is attached to the panel P. The carrier 40 has a spring blade 45 extending into the path of the arm 15. As the arm 15 approaches the position shown in Fig. 1, it engages the blade 45 to lift the mercury switch into open position and to hold it in open position so long as the arm 15 remains substantially in the position shown in Fig. 1. As the arm 15 moves from the position shown in Fig. 1, the blade 45 yields sufficiently not to impede the movement of the arm 15 and after the arm 15 moves out of engagement with the blade 45, the mercury switch drops by gravity into closed position, and remains in closed position until it is again elevated by the arm 15.

In circuit with the mercury switch is an electrically controlled heat generator including, for example, a motor-driven oil burner or coal furnace blower and to the arm 18 is attached a cable or the like for controlling the operation of dampers associated with said heat generator or for performing any other required mechanical movement. Thus, whenever the mercury switch is in closed position, the heat generator is energized to supply heat to the areas in which are arranged the thermostats $T_1$ to $T_5$. As long as the temperature in the areas in which the thermostats are arranged is above the temperature at which the thermostats are set to close, the control apparatus remains in the position shown in Fig. 1 with the mercury switch held in elevated or open position by the arm 15 and the prong 37 engaged with the spring 36 to keep the contacts 34 and 35 in open position. When the temperature at any thermostat drops to the temperature at which such thermostat is set to close, the closing of said thermostat causes the flow of current in heating coil 39 with consequent heating of the strip 32 and movement of its free end to the left to cause the prong 37 to slide off the left edge of the spring 36 with consequent closing of the contacts 34 and 35. The motor is then energized to rotate the disk 14 and after it has been rotated through an arc of approximately 180° it comes to rest as previously described with the prong 37 engaged with the spring 36 of the strip 32 in warped condition to open the contacts 34 and 35. Such rotation of the disk disengages the arm 15 from the plate 45 with consequent dropping of the mercury switch 40 into closed position to set in operation the heat generator.

The elements remain in the position last described until after the thermostats open due to temperature increase with consequent interruption of current flow through the heating coil 39, thus allowing the strip 32 to cool and return to original position. The movement of the end of the strip 32 to the right causes the prong 37 to slide off the right edge of the spring 36 to permit closure of the contacts 34 and 35 to again energize the motor which rotates the disk 14 again through an arc of approximately 180° to return the various parts to the position shown in Fig. 1 with consequent raising of the mercury switch to open position and de-energization of the heat generator.

A bracket 46 has different elevation horizontal parts supported by the panel P and brace 46a and a cradle 47 is pivotally supported by the bracket (Fig. 1). A pipe 48 is rigidly supported on the cradle 47 by a clamp 49 and is provided with terminal fittings 50 and 51. The lower and open end of a hollow glass vessel 52 is sealed in the fitting 50 and similarly sealed in the fitting 51 is a glass tube 53 also sealed in a fitting 54 at its upper end. To one end of the pipe 48 is attached a flexible metal hose 55 connected by suitable means (not shown) to the boiler of the heat generator below its normal water-line. Similarly attached to the fitting 54 is a flexible metal hose 56 connected by suitable means (not shown) to the boiler above its normal water-line. The upper double angle part of the bracket 46 has attached thereto a plate 57 of electrical insulating material which carries a pair of separated contacts 58 in circuit with the heater 39 (Fig. 14). A plate 59 fixed to the cradle 47 extends upwardly behind the plate 57 and carries an insulated brush 60 for engagement with the contacts 58, the brush 60 being slotted over a portion of its length to provide separate arms (Fig. 12). A lever 61 is pivoted by a pin 61a to the rear face of plate 59 and has a horizontal extension 62 terminating in a prong 63 and also carries a pin 64 which extends through an aperture in the plate 57 for engagement with a pair of bars 65 adjustably attached to the front face of the upper part of a bracket 46. Rocking of the cradle 47 brings the pin 64 into engagement with one of the two bars 65 with consequent rotation of the lever 61 relative to the plate 59 to cause lateral movement of the prong 63 to a greater extent than the lateral movement of pivot pin 61a (Figs. 11 and 13). The extent of lateral movement of the prong 63 is determined by adjustment of the bars 65. The width of the prong 63 and the thickness of the lever 66 is such as to permit a substantial amount of movement of the prong 63 without disengaging it from the lever 66.

Figure 3:
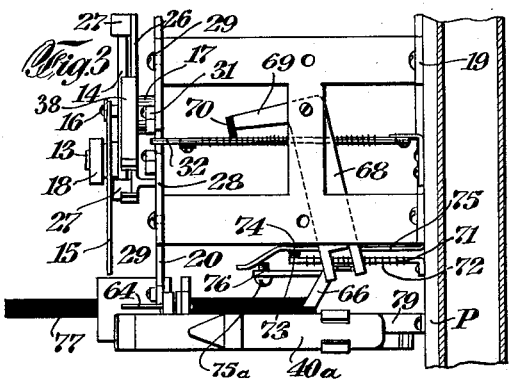
Fig. 3 is a plan view.

A vertically arranged lever 66 is pivotally supported on the lever 42 by a pin 67 and its upper end extends into a recess formed in one end of a horizontal lever 68 pivotally supported by the bracket 19 (Fig. 3). The lever 68 is equipped with an arm 69 having a prong 70 of electrical insulating material adapted under certain circumstances to engage the free end of the strip 32 either to return it to or maintain it in its extreme right position, thus either causing operation of the motor to return the parts to the position shown in Fig. 1 or preventing operation of the motor to move the parts from such position.

The lever 66 is so arranged as to have its lower end in register with the prong 63 when the cradle 47 is in such position that the major portion of the pipe 48 is horizontal and to have such lower end urged by gravity into contact with the prong 63. In such position of the lever 66, its upper end so locates the lever 68 that the prong 70 is out of engagement with the strip 32. However, in the event that the cradle 47 is tilted sufficiently either to the right or the left to effect disengagement of the prong 63 from the lever 66, then the lower end of the lever swings forward and the upper end swings rearwardly with consequent operation of the lever 68 to bring the prong 70 into contact with the strip 32, either to return the free end thereof to its extreme right position if warped out of such position by flow of current through heating coil 39 or to hold it in such position despite current flow through said coil.

Figure 4:
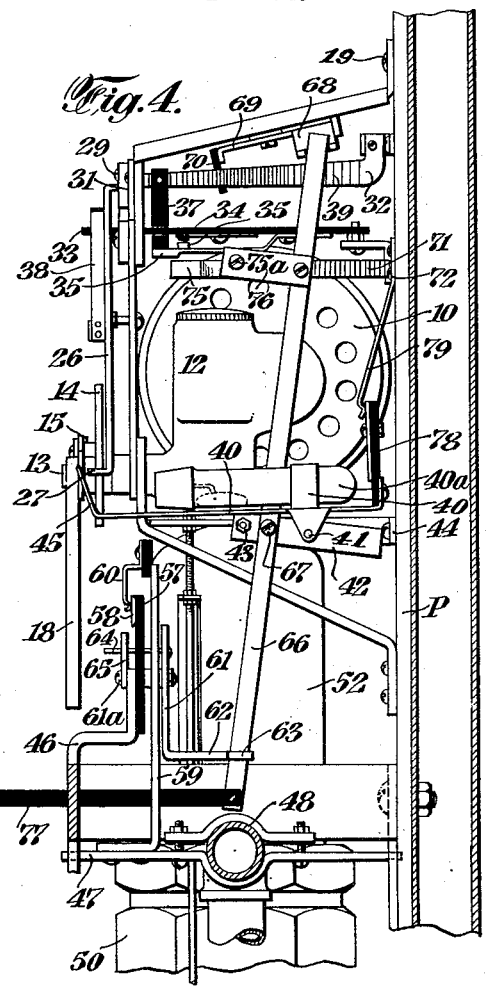
Fig. 4 is a view generally similar to Fig. 2 showing a different condition of the parts.

A second bi-metal thermostat strip 71 (Figs. 2 and 4) is attached at one end to the panel P and is surrounded by a heating coil 72. At its free end, the strip 71 is provided with a contact 73 (Fig. 14) adapted to engage a contact 74 at one end of a leaf spring 75 attached at its other end to the panel P. The leaf spring 75 is under tension tending to engage the contact 74 with the contact 73 but normally an adjusting screw 75a on the free end of the insulated arm 76 carried by the upper end of the lever 66 maintains the leaf spring in such position that the contacts 73 and 74 are out of engagement except when the strip 71 is sufficiently warped by heat supplied thereto from the heating coil 72 to effect engagement of the contact 73 with the contact 74 or when lever 66 takes the position shown in Fig. 4. The heating coil 72 is shunted around the contacts 58 and is in series with the heating coil 39 which is of much lower resistance. So long as the circuit of the coil 39 is closed through contacts 58 and brush 60, the heating coil 72 is de-energized. The contacts 73 and 74, when engaged, close a low resistance shunt circuit around the heating coil 72, such shunt circuit including signal means consisting of a buzzer B and a red light L7. Upon rocking of the cradle 47 in either direction sufficient to disengage the brush 60 from one contact 58, the short-circuit around the heating coil 72 is opened, thus causing current flow through the heating coil 72 with consequent energization thereof. Heating of the strip 71 due to energization of the coil 72 causes the strip to warp sufficiently to engage the contact 73 with the contact 74 thereby causing current flow through the shunt circuit including the buzzer B and red light L7 with consequent energization of said signal means.

The closing of the signal energizing circuit reduces the current flow through the heater 72 with consequent cooling of the strip 71 to disengage the contact 73 from the contact 74 thereby opening the signal circuit to interrupt the operation of the signal. Current flow is then re-established through the heating coil 72 to repeat the cycle above described and such repetition of the cycle is continued so long as the brush 60 remains out of engagement with one contact 58 and the cradle 47 is not rocked sufficiently to disengage the prong 63 from the lever 66.

Under normal operating conditions, the level of water in the vessel 52 bears such relation to the level of water in the tube 53 so that the cradle 47 is maintained with the major portion of the pipe 48 substantially in horizontal position. Rocking of the cradle is effected by variation in the relation of liquid levels in the vessel 52 and in the tube 53 due to the liquid level in the boiler being too high, the liquid level in the boiler being too low or the steam pressure in the boiler exceeding a predetermined limit. Ordinarily, any change in the relation of the liquid levels in the vessel 52 and the tube 53 occurs gradually and the intermittent operation of the signal means calls the attention of the attendant to the condition in time for him to remedy the condition before it becomes dangerous. However, means are provided so that in the event of a large change in the relation of the liquid levels in the vessel 52 and tube 53 due to excessive steam pressure or a boiler rupture or the like or due to failure of the attendant to rectify the condition indicated by the intermittent operation of the signaling means, the control apparatus will act to de-energize the heat generator or prevent its energization and simultaneously effect continuous operation of the signal means.

The means just referred to include the lever 66 and the arm 76 carried thereby. Upon a large change in the liquid levels, the cradle is rocked sufficiently to disengage the prong 63 from the lever 66 whereupon the lever 66 swings to disengage the arm 76 from the end of the leaf spring 75 to allow it to move the contact 74 into engagement with the contact 73. The contact 74 will remain engaged with the contact 73 irrespective of movement of the bi-metal strip 71, so that the signalling means are continuously energized. This produces a steady signal in L7 and the buzzer indicating an emergency condition of the heating plant. Also, the lever 66 swings the arm 68 to cause the prong 70 to engage the end of the strip 32 either to move it to its extreme right position and/or hold it in such position, thereby discontinuing operation of the heat generator.

A plunger 77 is connected to the lower end of the lever 66 for returning the lever to a position to be engaged by the prong 63. However, such engagement cannot be re-established until after the cradle is returned to normal position by proper re-arrangement of the water levels in the vessel 52 and tube 53.

The mercury switch carrier 40 is provided with a contact 78 which engages a contact 79 carried by the panel P when the mercury switch is in closed position. These contacts are connected in series with a green signal light, the energization of which indicates that the control circuit for the heat generator is closed and that heat is being supplied.

Behind glass tube 53 is mounted a scale 80 bearing two arms 81 and 82, marked respectively "No steam" and "Full steam." These arms are so adjusted on each installation that their upper edges are level with the water in the tube when the connected heating system is cold and steam saturated. Contacts 58 are opened by brush 60 when the lower arm is reached, thereby shutting down the control as soon as the heating system is steam saturated, irrespective of the steam pressure involved.

In Fig. 14 are illustrated the electrical connections for the entire control system above described. The motor 10 is bridged across the two wires of a 110 volt circuit in series with a snap switch and the contacts 34 and 35. The motor 90 of a blower or oil burner or an electrically controlled gas valve is connected in circuit with the contacts of the mercury switch 40. Each of the room thermostats $T_1$, $T_2$, $T_3$, $T_4$ and $T_5$ and the indoor riser thermostat $T_6$ has one terminal connected to a bus bar B. B. which is connected to the terminal T' of the secondary of a step-down transformer T, the primary of which is bridged across a 110 volt line. From the remaining terminal T'' of said secondary, a first circuit may be traced to the right contact 58, through the brush 60 to the left contact 58, thence through heating coil 39 to a switch S, then through lamps $L_1$, $L_2$, $L_3$, $L_4$, $L_5$ and $L_6$, in parallel, and the resistances R to the remaining terminals of the thermostats $T_1$, $T_2$, $T_3$, $T_4$, $T_5$ and one terminal of the outdoor thermostat $T_7$, the remaining terminal of which is connected to the remaining terminal of the thermostat $T_6$. In shunt to the contacts 58 and heating coil 39 is a second circuit comprising the heating coil 72. When the contacts 73 and 74 engage, due to warping of the strip 71 by heat supplied thereto from the coil 72 when energized, a third circuit is formed in shunt around the heating coil 72, this third circuit including, in addition to the contacts 73 and 74, a portion of the leaf spring 75, the bi-metal strip 71, together with the buzzer and lamp $L_7$, the lamp and buzzer being connected in parallel with respect to each other.

Whenever the contacts of one of the thermostats $T_1$ to $T_5$ or the contacts of thermostats $T_6$ and $T_7$ are closed, and the contacts 58 are bridged by the brush 60, current flows in the heater coil 39 circuit with consequent energization of the respective lamps L1 to L6 depending on which thermostats are closed. The lights thus signal to the attendant the areas calling for heat and the condition of the riser and outdoor thermostats. Under such circumstances, the heating coil 72 is de-energized. Should the brush 60 be moved from bridging relation to the contacts 58, thus breaking the circuit just described, current is caused to flow through the heating coil 72, thereby generating sufficient heat to cause warping of the strip 71 to bring the contact 73 into engagement with the contact 74. Such engagement of these contacts closes the signal energizing circuit with consequent de-energization of the heating coil 72 due to the lower resistance of the signal circuit. De-energization of the heating coil 72 results in cooling of the strip 71 and its consequent return to positions in which the contact 73 is disengaged from the contact 74 thereby causing re-energization of the heater coil 72 and repetition of the cycle above described. Whenever the heater 39 is de-energized by movement of the brush 60 out of bridging relation to the contacts 58 which adds the comparatively high resistance of coil 72, the strip assumes the position in which it maintains the heat source in inoperative condition due to insufficient current in the coil 39. Also, upon closing of the contacts 73 and 74 by release of the leaf spring due to movement of the member 76, the signal circuit is continuously energized. Energization of the lamp L1 to L5 continues irrespective of the operations just described, so long as the corresponding thermostats T1 to T5 inclusive are in closed condition.

With the contacts 78 and 79 engaged, a fourth circuit may be traced from said terminal T" through the contacts 79 and 78, through the preferably green light L8, upper resistance R, to the bus bar B. B. and thence to the terminal T' of the transformer secondary. This circuit is closed whenever the mercury switch 40 is closed and the green light indicates to the attendant that the heat generator is in operation. Any one of the thermostats and its corresponding lamp may be cut out of the circuits described by the manipulation of the switch in series therewith should occasion arise for such disconnection. Also, the lamp L6 and the thermostats T6 and T7 may be removed from such circuit by the operation of the switch associated therewith.

In the foregoing description, it has been assumed that the current supplied by the closing of a single room thermostat would supply sufficient energy to warp the thermostat strip 32 into position to close the motor circuit. It is contemplated that in many installations the arrangement will be such that sufficient energy to warp the thermostat strip 32 will not be supplied upon the closing of a single thermostat, but will be supplied only upon the closing of two or more thermostats. This arrangement prevents operation of the heat generator in response to an abnormal heat condition existing at only one thermostat location while suitable conditions prevail at the other thermostat locations. To facilitate this effect, each thermostat circuit is brought up to a standard electric resistance by the insertion therein of the necessary resistance R. There is no resistance added in circuit with thermostat T6, consequently this thermostat actuates the control alone. This latter effect may be enhanced by placing a resistance around lamp L6, as shown. Thermostat T6 is fastened to a steam pipe at the farthest away point from the boiler. It operates to keep the heating system mildly heated at all times irrespective of the room thermostats. T7 is placed in series with it so as to open this circuit when the weather is mild outdoors.

One of the advantages in the use of the described heat control system is that the room thermostats can be so made and adjusted as to close and open their contacts on extremely minute temperature changes of air surrounding them. For example, thermostats such as shown and described in my co-pending application, Ser. No. 272,952 may be used, such thermostat being sensitive to a temperature change of a half degree. However, if this is done eddy currents of air of slightly different temperatures, as well as mechanical vibrations, cause the contacts to open or close, when the actual average room temperatures do not so indicate. Due to the heat absorbent factor of bi-metal strip 32, this does not cause premature operation of the control, either to perform the "on" or "off" operation; as a definite amount of heat energy from coil 39 must first be absorbed by strip 32, before it can trip switch 33 controlling motor 10. In practice it will be found that on a reasonably cold day the signal lights L1-L5 will be blinking on and off continually and that only when the "on" period of one, two or more lamps, according to the control adjustment, represent a time period greater than the "off" periods, does the control operate. Conversely, after operation, when the "off" periods of the lamps become longer than the "on" periods, then the control returns to the heat "off" position. In each case control operation is irrespective of whether the signal lights and consequently the thermostat contacts are on steadily or remain off steadily or whether the lights are blinking and the thermostat contacts intermittently closing and opening.

While the description herein given has applied to heat generators it is contemplated that by merely reversing the bi-metal element of the thermostats used, the system can be applied to air cooling, especially as the latter demands a close temperature control on account of the cost factor involved in cooling air.

I claim:

1. A control device for an attemperating system including electrically energized means for producing temperature changes in an enclosed area, said device comprising a control switch for said means supported for automatic movement into closed position, a motor driven rotatable arm adapted during each revolution to move said switch to open position and release such switch for automatic return to closed position, a motor circuit including a pair of self-closing contacts, a carrier supporting said contacts and movable between two positions, a thermostat strip supporting an insulated member and arranged upon change of its temperature to move said insulated member between two positions corresponding to the two positions of said carrier, said insulating member being adapted when it and said carrier are in corresponding positions to open said contacts, a heating circuit for said thermostat strip including one or more thermostats, means operated in timed relation to said arm for moving said carrier between its two positions, additional means operated in timed relation to said arm for moving said insulated member out of contact-engaging position during movement of said carrier and releasing said insulated member for return to contact-opening position, the actuation of said insulated member and carrier being timed to stop the arm twice during each complete revolution thereof and the arm being operative in one position of rest to hold said control switch in open position.

2. A control device for a heating system including a boiler and an electrically energized heat source, said device comprising a heat source control switch for said means supported for automatic movement into closed position, a motor driven rotatable arm adapted during each revolution to move said switch to open position and release such switch for automatic return to closed position, a motor circuit including a pair of self-closing contacts, a carrier supporting said contacts and movable between two positions, a thermostat strip supporting an insulated member and arranged upon change of its temperature to move said insulated member between two positions corresponding to the two positions of said carrier, said insulating member being adapted when it and said carrier are in corresponding positions to open said contacts, a heating circuit for said thermostat strip including one or more thermostats, means operated in timed relation to said arm for moving said carrier between its two positions, additional means operated in timed relation to said arm for moving said insulated member out of contact-engaging position during movement of said carrier and releasing said insulated member for return to contact-opening position, the actuation of said insulated member and carrier being timed to stop the arm twice during each complete revolution thereof and the arm being operative in one position of rest to hold said heat source control switch in one position, and means responsive to predetermined changes of steam and water conditions within said boiler to return said insulated member to or hold said insulated member in the position assumed by it to stop said arm in open position of said control switch.

3. A control device for a heating system including a boiler and an electrically energized heat source, said device comprising a heat source control switch supported for automatic movement into closed position, a motor driven rotatable arm adapted during each revolution to move said switch to open position and release such switch for automatic return to closed position, a motor circuit including a pair of self-closing contacts, a carrier supporting said contacts and movable between two positions, a thermostat strip supporting an insulated member and arranged upon change of its temperature to move said insulated member between two positions corresponding to the two positions of said carrier, said insulating member being adapted when it and said carrier are in corresponding positions to open said contacts, a heating circuit for said thermostat strip including one or more thermostats, means operated in timed relation to said arm for moving said carrier beween its two positions, additional means operated in timed relation to said arm for moving said insulated member out of contact-engaging position during movement of said carrier and releasing said insulated member for return to contact-opening position, the actuation of said insulated member and carrier being timed to stop the arm twice during each complete revolution thereof and the arm being operative in one position of rest to hold said heat source control switch in open position, means responsive to predetermined changes of steam and water conditions within said boiler to return said insulated member to or hold said insulated member in the position assumed by it to stop said arm in open position of the heat source control switch, and signal means operated intermittently in response to slight changes of steam and water conditions in the boiler and operated continuously in response to said predetermined changes of steam and water conditions.

4. In a device of the character described, an oscillatable carrier movable between two positions, a pair of co-operating self-closing contacts supported thereby for relative movement, a strip of thermostatic material supported in parallel relation to said carrier, an insulated member carried by one end of said strip and being movable by said strip upon change of its temperature between two positions corresponding to the two positions of said carrier, said insulated member being adapted when it and said carrier are in corresponding positions to engage one of said contacts to move it away from the other contact, means for effecting change of temperature of said thermostatic strip, a motor having said contacts in its energizing circuit, means actuated by said motor to move said carrier between its two positions, to lift said member out of engaging relation to said one contact and to release said member for engagement with said contact.

5. In a device of the character described, an oscillatable carrier movable between two positions, a pair of co-operating self-closing contacts supported thereby for relative movement, a strip of thermostatic material supported in parallel relation to said carrier, an insulated member carried by one end of said strip and being movable by said strip upon change of its temperature between two positions corresponding to the two positions of said carrier, said insulated member being adapted when it and said carrier are in corresponding positions to engage one of said contacts to move it away from the other contact, means for effecting change of temperature of said thermostatic strip, a motor having said contacts in its energizing circuit, a pivoted rocker connected to said motor for oscillation thereby and connected to said carrier to effect oscillation thereof, a movable rider engaging one end of said strip and being supported for automatic movement toward the axis of said rocker and for movement by said rocker away from the axis thereof to move said insulating member out of engaging relation to said one contact.

6. In a device of the character described, an oscillatable carrier movable between two positions, a pair of co-operating self-closing contacts supported thereby for relative movement, a strip of thermostatic material supported in parallel relation to said carrier, an insulated member carried by one end of said strip and being movable by said strip upon change of its temperature between two positions corresponding to the two positions of said carrier, said insulated member being adapted when it and said carrier are in corresponding positions to engage one of said contacts to move it away from the other contact, means for effecting change of temperature of said thermostatic strip, a motor having said contacts in its energizing circuit, an eccentric disk driven by said motor, a pivoted rocker connected to said disk for oscillation thereby and having resilient connection with said carrier to effect oscillation thereof, a movable rider engaging one end of said strip and being supported for automatic movement toward the axis of said rocker and for movement by said rocker away from the axis thereof to lift said insulating member out of engaging relation to said one contact.

7. In a device of the character described, a carrier horizontally oscillatable between two positions and having a cut-out portion at its free end, a leaf spring fixed at one end to said carrier and having its other end in register with said cut-out portion, co-operating contacts carried by said carrier and said leaf spring, a strip of resilient thermostatic material supported in parallel relation to said carrier, an insulated member carried by said strip and being movable by said strip upon change of its temperature between two positions corresponding to the two positions of said carrier, said insulated member being adapted when it and said carrier are in corresponding positions to engage said leaf spring to separate said contacts, means for effecting change of temperature of said thermostatic strip, a motor having said contacts in its energizing circuit, a pivoted rocker having a prong extending into the cut-out portion of said carrier and being connected to said motor for oscillation thereby, spring arms carried by said rocker and extending into said cut-out portion, a vertically movable rider engaging the end of said thermostatic strip and being engageable by said prong to lift said insulated member in timed relation with horizontal movement of said carrier.

8. In a control device for a heating system including a boiler and an electrically energized heat source, a resilient thermostat strip fixed at one end, means controlled by movement of the other end of said strip to energize or de-energize said heat source, means for effecting variation of temperature of said strip and means responsive to predetermined changes of steam and water conditions within said boiler to return said first-named means to or retain said first-named means in heat-source de-energizing position.

9. In a control device for a heating system in cluding a boiler and an electrically energized heat source, a resilient thermostat strip fixed at one end, means controlled by movement of the other end of said strip to energize and de-energize said heat source, a pivoted arm movable to return said control means to or retain said control means in heat source de-energizing position, a lever having one end connected to said arm, said lever being mounted for automatic swinging to bring said arm into heat source-de-energizing position, a latch normally engaging said lever to hold it out of its heat-source de-energizing position, and means responsive to predetermined changes in steam and water conditions within said boiler to disengage said latch from said lever.

10. In a control device for a heating system including a boiler and an electrically energized heat source, a resilient thermostat strip fixed at one end, means for effecting variation of temperature of said strip, means controlled by movement of the other end of said strip to energize and de-energize said heat source, a pivoted arm movable to return said control means to or retain said control means in heat-source de-energizing position, a lever having one end connected to said arm, said lever being mounted for automatic swinging to bring said arm into heat-source de-energizing position, a pivoted cradle, a latch member carried by said cradle for engagement with said lever to maintain it out of heat-source de-energizing position, and means carried by said cradle in communication with said boiler for effecting pivotal movement thereof responsive to changes of steam and water conditions within said boiler.

11. In a control device for a heating system including a boiler and an electrically energized heat source, a resilient thermostat strip fixed at one end, means controlled by movement of the other end of said strip to energize and de-energize said heat source, a pivoted arm movable to return said control means or retain the said control means in heat-source de-energizing position, a lever having one end connected to said arm, said lever being mounted for automatic swinging to bring said arm into heat source de-energizing position, a pivoted cradle, an arm pivoted to said cradle at a point removed from the cradle axis and having a portion at one end engageable with said lever to hold it in heat-source de-energizing position, stationary means engageable by the other end of said lever to effect rotation thereof relative to said cradle, and means carried by said cradle in communication with the interior of said boiler for effecting rocking of said cradle upon change of steam and water conditions in said boiler.

12. In a control device for a heating system including a boiler and an electrically energized heat source, a resilient thermostat strip fixed at one end, means controlled by movement of the other end of said strip to energize and de-energize said heat source, a heating circuit for said strip including a pair of stationary contacts and a heater coil, a bridging conductor movable into and out of bridging relation to said contacts in response to changes in steam and water conditions in said boiler, a shunt circuit around said contacts and heater coil including a second heater coil of higher resistance than said first heater coil, a normally open shunt circuit around said second heater coil and including signal means, and a thermostat strip associated with said second heater coil and adapted when heated to close said signal circuit.

13. In a control device for a heating system including a boiler and an electrically energized heat source, a resilient thermostat strip fixed at one end, means controlled by movement of the other end of said strip to energize and de-energize said heat source, means including a lever for returning said control means to or retaining the same in heat-source de-energizing position, said lever being mounted for automatic swinging into heat-source de-energizing position, means normally maintaining said lever out of heat-source de-energizing position and responsive to predetermined changes in steam and water conditions in said boiler to release said lever, and signal means actuated by movement of said lever into heat-source-deenergizing position.

14. In a control device for a heating system including a boiler and an electrically energized heat source, a resilient thermostat strip fixed at one end, means including a pair of spaced stationary contacts and a heater coil for effecting variation of the temperature of said strip, means controlled by the movement of the other end of said strip for energizing and de-energizing said heat source, a pivoted cradle, means carried by said cradle in communication with said boiler for effecting pivotal movement thereof responsive to changes of steam and water conditions within said boiler, and a bridging conductor carried by said cradle for movement into and out of bridging relation to said contacts.

15. In a control device for a heating system including a boiler and an electrically energized heat source, a resilient thermostat strip fixed at one end, means including a pair of spaced stationary contacts and a heater coil for effecting variation of the temperature of said strip, means controlled by the movement of the other end of said strip for energizing and de-energizing said heat source, a pivoted cradle, means carried by said cradle in communication with said boiler for effecting pivotal movement thereof responsive to changes of steam and water conditions within said boiler, a bridging conductor carried by said cradle for movement into and out of bridging relation to said contacts, a shunt circuit around said contacts and heater coil including a second heater coil of higher resistance than said first heater coil, an open second shunt circuit around said second heater coil and including signal means, and a thermostat strip associated with said second heater coil and adapted, when heated, to close said signal circuit.

16. In a control device for a heating system including a boiler and an electrically energized heat source, a resilient thermostat strip fixed at one end, means including a pair of spaced stationary contacts and a heater coil for effecting variation of the temperature of said strip, means controlled by the movement of the other end of said strip for energizing and de-energizing said heat source, a pivoted cradle, means carried by said cradle in communication with said boiler for effecting pivotal movement thereof responsive to changes of steam and water conditions within said boiler, a bridging conductor carried by said cradle for movement into and out of bridging relation to said contacts, means including a lever for returning said control means to or retaining the same in heat-source de-energized position, said lever being mounted for automatic swinging into heat-source de-energized position, and means on said cradle normally engaging said lever to maintain it out of heat-source de-energized position and movable with said cradle to release said lever.

17. In a control device for a heating system including a boiler and an electrically energized heat source, a resilient thermostat strip fixed at one end, means including a pair of spaced stationary contacts and a heater coil for effecting variation of the temperature of said strip, means controlled by the movement of the other end of said strip for energizing and de-energizing said heat source, a pivoted cradle, means carried by said cradle in communication with said boiler for effecting pivotal movement thereof responsive to changes of steam and water conditions within said boiler, a bridging conductor carried by said cradle for movement into and out of bridging relation to said contacts, a shunt circuit around said contacts and heater coil including a second heater coil of higher resistance than said first heater coil, an open second shunt circuit around said second heater coil and including signal means, a thermostat strip associated with said second heater coil and adapted, when heated, to close said signal circuit, means including a lever for returning said control means to or retaining the same in heat-source de-energized position, said lever being mounted for automatic swinging into heat-source de-energized position, and means on said cradle normally engaging said lever to maintain it out of heat-source de-energized position and movable with said cradle to release said lever.

18. A control device for an attemperating system including electrically energized means for producing temperature changes in an enclosed area, said device comprising a mercury switch tiltably supported for gravity actuation into closed position, a rotatable arm adapted during each revolution to move said mercury switch to open position and release the same for automatic return to closed position, a driving motor for said arm, a motor-energizing circuit including a pair of self-closing contacts, a carrier supporting said contacts and movable between two positions, an insulated member supported by thermally-responsive means arranged upon change of temperature to move said insulated member between two positions corresponding to the two positions of said carrier, said insulated member being adapted when it and said carrier are in corresponding positions to open said contacts, temperature-controlled means for heating said thermally-responsive means, and means operated by said motor for moving said carrier between its two positions and for moving said insulated member out of contact-engaging position during movement of said carrier and releasing said insulated member for return to contact-open position, the actuation of said insulating member and carrier being timed to stop said arm twice during each complete revolution thereof and the arm in one position of rest holding said mercury switch in open position.

19. A control device for a heating system including a boiler and an electrically energized heat source, said device comprising a mercury switch tiltably supported for gravity actuation into closed position, a rotatable arm adapted during each revolution to move said mercury switch to open position and release the same for automatic return to closed position, a driving motor for said arm, a motor-energizing circuit including a pair of self-closing contacts, a carrier supporting said contacts and movable between two positions, an insulated member supported by thermally-responsive means arranged upon change of temperature to move said insulated member between two positions corresponding to the two positions of said carrier, said insulated member being adapted when it and said carrier are in corresponding positions to open said contacts, temperature-controlled means for heating said thermally-responsive means, means operated by said motor for moving said carrier between its two positions and for moving said insulated member out of contact-engaging position during movement of said carrier and releasing said insulated member for return to contact-open position, the actuation of said insulating member and carrier being timed to stop said arm twice during each complete revolution thereof and the arm in one position of rest holding said mercury switch in open position, and means responsive to predetermined changes of steam and water conditions within said boiler to return said insulated member to or hold said insulated member in the position in which it effects stoppage of said arm with the mercury switch in open position.

20. A control device for a heating system including a boiler and an electrically energized heat source, said device comprising a mercury switch tiltably supported for gravity actuation into closed position, a rotatable arm adapted during each revolution to move said mercury switch to open position and release the same for automatic return to closed position, a driving motor for said arm, a motor-energizing circuit including a pair of self-closing contacts, a carrier supporting said contacts and movable between two positions, an insulated member supported by thermally-responsive means arranged upon change of temperature to move said insulated member between two positions corresponding to the two positions of said carrier, said insulated member being adapted when it and said carrier are in corresponding positions to open said contacts, temperature-controlled means for heating said thermally-responsive means, means operated by said motor for moving said carrier between its two positions and for moving said insulated member out of contact-engaging position during movement of said carrier and releasing said insulated member for return to contact-open position, the actuation of said insulating member and carrier being timed to stop said arm twice during each complete revolution thereof and the arm in one position of rest holding said mercury switch in open position, means responsive to predetermined changes of steam and water conditions within said boiler to return said insulated member to or hold said insulated member in the position in which it effects stoppage of said arm with the mercury switch in open position, and signal means operated intermittently in response to slight changes of steam and water conditions in the boiler and operated continuously in response to said predetermined changes of steam and water condition.

21. In a control device for an attemperating system including an electrically energized attemperating source, a resilient thermostat strip fixed at one end, means controlled by movement of the other end of said strip to energize and de-energize said attemperating source, a heating circuit for said strip including a pair of stationary contacts and a heater coil, a bridging conductor movable into and out of bridging relation to said contacts in response to changes in conditions in said attemperating source, a shunt circuit around said contacts and heater coil including a second heater coil of higher resistance than said first heater coil, a normally open shunt circuit around said second heater coil, and including signal means, and a thermostat strip associated with said second heater coil and adapted when heated to close said signal circuit.

HUBERT S. TURNER.